US010103837B2

(12) United States Patent
Lackey, Jr. et al.

(10) Patent No.: US 10,103,837 B2
(45) Date of Patent: Oct. 16, 2018

(54) ASYNCHRONOUS FEEDBACK TRAINING

(71) Applicants: Advanced Micro Devices, Inc., Sunnyvale, CA (US); ATI Technologies ULC, Markham (CA)

(72) Inventors: Stanley Ames Lackey, Jr., Leominster, MA (US); Damon Tohidi, Richmond Hill (CA); Gerald R. Talbot, Concord, MA (US); Edoardo Prete, Arlington, MA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 100 days.

(21) Appl. No.: 15/191,322

(22) Filed: Jun. 23, 2016

(65) Prior Publication Data

US 2017/0373788 A1  Dec. 28, 2017

(51) Int. Cl.
*H04L 1/00* (2006.01)
*H04L 7/00* (2006.01)
*H04L 12/70* (2013.01)

(52) U.S. Cl.
CPC .......... *H04L 1/0002* (2013.01); *H04L 1/0073* (2013.01); *H04L 7/0037* (2013.01); *H04L 2012/5681* (2013.01)

(58) Field of Classification Search
None
See application file for complete search history.

(56) References Cited

U.S. PATENT DOCUMENTS

| 7,802,153 | B1 | 9/2010 | Cekleov et al. |
| 8,760,946 | B2 | 6/2014 | Dearth et al. |
| 2004/0263226 | A1* | 12/2004 | Kim ..................... H03L 7/0805 327/158 |
| 2005/0041683 | A1 | 2/2005 | Kizer |

(Continued)

OTHER PUBLICATIONS

Lackey, et al., U.S. Appl. No. 15/192,287, entitled "Channel Training Using a Replica Lane", filed Jun. 24, 2016, 31 pages.

(Continued)

*Primary Examiner* — Jeffrey M Rutkowski
*Assistant Examiner* — Mehedi Aley
(74) *Attorney, Agent, or Firm* — Meyertons Hood Kivlin Kowert & Goetzel PC; Rory D. Rankin (57) ABSTRACT

Systems, apparatuses, and methods for implementing asynchronous feedback training sequences are described. A transmitter transmits a training sequence indication to a receiver via a communication channel including a plurality of data lines. The training sequence indication includes a bit sequence to indicate the beginning of a training sequence. The indication includes a transition from a zero to a one at the midpoint of a supercycle of 'N' clock cycles in length, followed by a predetermined number of ones. The training sequence indication is then followed by a test pattern. The beginning of the test pattern occurs at the end of a supercycle. The receiver determines if there are any errors in the received test pattern, and then sends feedback to the transmitter that indicates whether any errors were detected. Responsive to receiving the feedback, the transmitter alters delay settings for one or more of the data lines.

14 Claims, 7 Drawing Sheets

(56) References Cited

U.S. PATENT DOCUMENTS

| | | | | |
|---|---|---|---|---|
| 2008/0075156 A1* | 3/2008 | Schumacher | ....... | G06F 11/1004 375/226 |
| 2011/0040902 A1 | 2/2011 | Housty | | |
| 2012/0106687 A1* | 5/2012 | Bulzacchelli | ........... | H04L 25/14 375/354 |
| 2013/0036336 A1* | 2/2013 | Kitamura | ............ | G06F 11/1004 714/712 |
| 2017/0070338 A1* | 3/2017 | Giriyappa | ............. | H04L 7/0041 |
| 2017/0091028 A1* | 3/2017 | Golan | .................. | G11C 16/349 |

OTHER PUBLICATIONS

Communication pursuant to Article 94(3) in European Application No. 16201233.0, dated Jun. 13, 2017, 7 pages.
Communication pursuant to Article 94(3) in European Application No. 16201233.0, dated Dec. 22, 2017, 5 pages.

* cited by examiner

ASYNCHRONOUS FEEDBACK TRAINING

BACKGROUND

Technical Field

Embodiments described herein relate to data communication and more particularly, to performing training of bit-serial data links.

Description of the Related Art

The data throughput of integrated circuits continues to increase as applications' demand and consumption of data increases. For example, the rate of improvement in microprocessor speed continues to exceed the rate of improvement in memory speed. Increasing the rate at which data is transmitted increases the timing requirements of the circuitry used to transmit and receive the data. In many circuits utilized in computing devices and computing systems, data is transferred within these circuits using a global clock. For example, the rising edge of the clock may load the data coming in to a flip-flop, and then the data can be passed on or processed from the flip-flop. In some scenarios, a single clock may be used to latch in a data bus of multiple data lanes. However, this limits the speed of the data bus because the transition of the clock has to be used for the whole data bus, but some bits of data may take longer to get down the bus relative to other bits of data. If the variation between data lanes is too high, then a location for placing the clock edge to correctly clock in the whole data bus may not exist.

SUMMARY

Systems, apparatuses, and methods for performing training of a bit-serial data link are contemplated.

In one embodiment, an asynchronous feedback training (AFT) sequence is implemented to test delay settings between a transmitter and a receiver. The transmitter is coupled to the receiver via a communication channel of one or more data lanes. The transmitter and the receiver each include a counter for counting supercycles, with a single supercycle defined as corresponding to 'N' clock cycles of a higher frequency system clock, where 'N' is a positive integer greater than one. In one embodiment, a supercycle is eight system clock cycles long. In other embodiments, the supercycle is some other number of clock cycles.

In order to perform an AFT sequence, the transmitter is configured to transmit a beginning of training sequence indication (or "training sequence indication") to the receiver on one or more lanes of the channel. In various embodiments, the training sequence indication consists of a bit transition from a bit with a first value to a bit with a second different value followed by a predetermined number of bits with the second value. For example, in one embodiment, a training sequence indication begins with a series of zeroes followed by a series of ones wherein the sequence has a predetermined length. In one embodiment, the transition from the series of zeroes to the series of ones occurs at a midpoint of a supercycle.

After the transmitter sends the training sequence indication to the receiver, the transmitter sends a test pattern to the receiver. The transition from the training sequence indication to the test pattern occurs at a supercycle boundary. In one embodiment, the test pattern is a pseudo-random binary sequence (PRBS). The receiver is configured to sample a state of the one or more data lanes of the channel at the end of each supercycle. The receiver determines if a transition occurs on each lane between two tests at the ends of successive supercycles. If the receiver determines that a transition has occurred on a given lane between two successive tests, the receiver captures the test pattern a predetermined number of supercycles after the transition is detected. Then, the receiver determines if any errors are detected in the received test pattern.

After the transmitter sends the test pattern to the receiver on a given data lane, the transmitter disables its output buffer coupled to the given data lane. The transmitter then waits for feedback from the receiver regarding the transmitted test pattern. After the receiver has determined whether any errors are detected in the test pattern, the receiver sends feedback to the transmitter to indicate if any errors were detected in the captured test pattern. In one embodiment, the receiver drives the line to a first polarity (e.g., high voltage) if the data was received with no errors or drive the line to a second polarity (e.g., low voltage) if the data was received with one or more errors. The transmitter then waits a predetermined number of clock cycles after finishing sending the test pattern before capturing a state of the given data lane. The transmitter then utilizes the captured state of the given data lane to determine how to adjust a delay setting for the given data lane.

In one embodiment, the transmitter implements a plurality of AFT sequences with different delay settings for each data lane of the channel. The feedback from the receiver for these AFT sequences is used by the transmitter to determine the location of the data valid period (or "data eye"). While performing a series of AFT sequences, the transmitter identifies a transition from an error result to an error-free result as indicated by the receiver to determine the start of the data eye for a given data lane. The transmitter then identifies a transition from an error-free result to an error result to determine the end of the data eye. The transmitter then takes the average of the start and end of the identified beginning and end of the data eye to determine a sampling point at the center of the data eye. The transmitter then adjusts the delay settings for the given data lane to the determined sampling point.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments can be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements are exaggerated relative to other elements.

Figure 1:
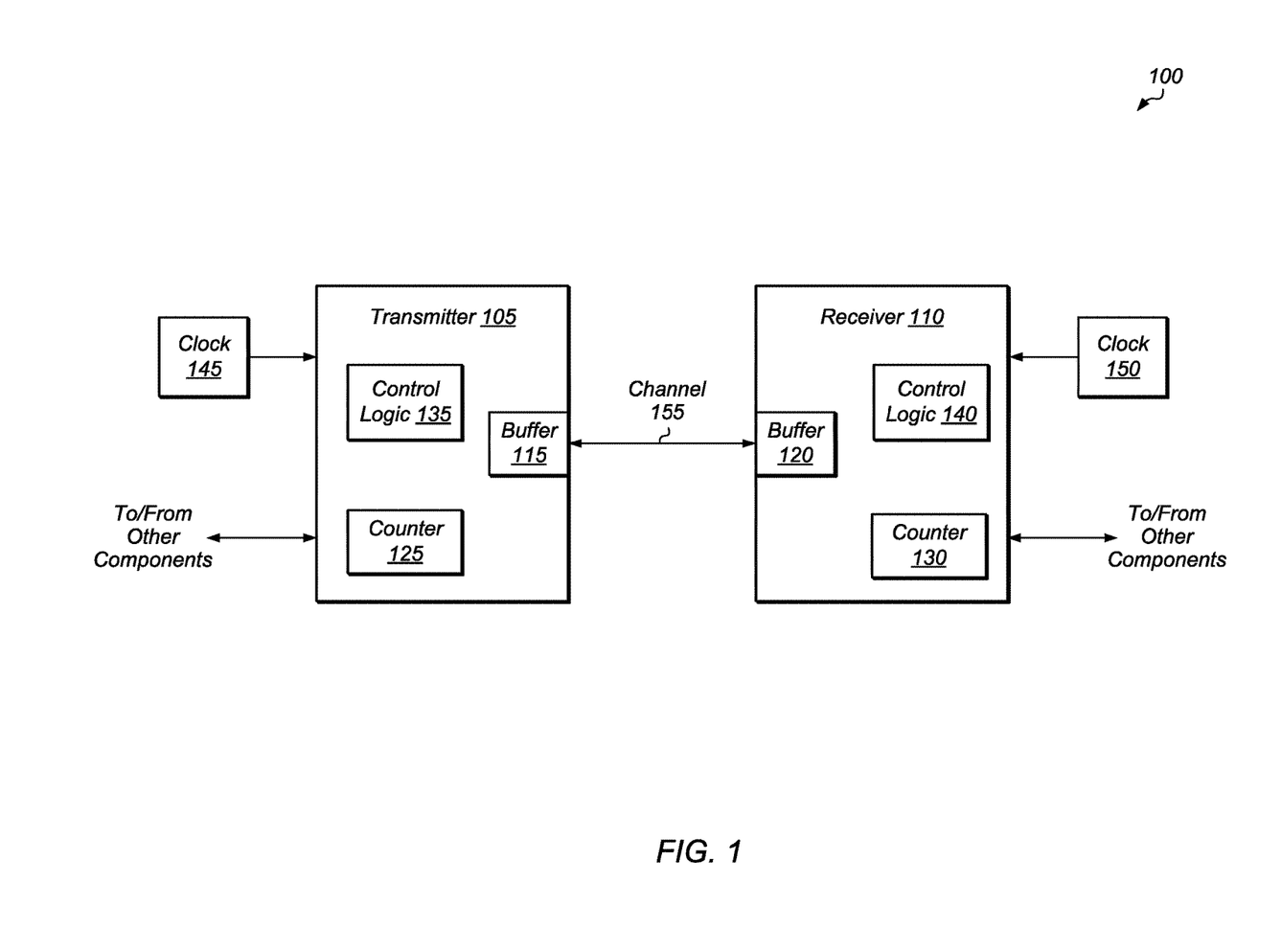
FIG. 1 is a block diagram of one embodiment of a transmitter and a receiver of a computing system.

Referring now to FIG. 1, a block diagram illustrating one embodiment of a transmitter 105 and a receiver 110 of a computing system 100 is shown. Transmitter 105 is coupled to receiver 110 via channel 155. Channel 155 includes any number of data lanes, depending on the embodiment. Channel 155 also includes a clock lane and/or one or more other lanes. Computing system 100 also includes clock 145, clock 150, and one or more other components not shown to avoid obscuring the figure. For example, computing system 100 includes one or more processing units (e.g., processor, processor core, programmable logic device, application specific integrated circuit), one or more memory devices, and/or other components. The one or more processing units are configured to execute instructions and/or perform one or more types of computations (e.g., floating point, integer, memory, I/O) depending on the embodiment. In various embodiments, the components of computing system 100 are interconnected by one or more communication buses. In one embodiment, transmitter 105 and receiver 110 are in the memory path of a processor. In various embodiments, the memory coupled to the processor is a double data rate synchronous dynamic random-access memory (DDR SDRAM). In other embodiments, the memory is implemented using other types of memory devices.

Transmitter 105 includes buffer 115 coupled to channel 155. In one embodiment, buffer 115 is a tri-state buffer for driving an output on channel 155 or creating a high impedance state when transmitter 105 is waiting to receive feedback from receiver 110 on the status of an asynchronous feedback training sequence. Transmitter 105 also includes control logic 135 for generating asynchronous feedback training sequences, controlling delay settings for the lanes of channel 155, and/or performing other functions. Transmitter 105 also includes counter 125 for counting supercycles. In various embodiments, a supercycle is 'N' clock cycles long, with 'N' being a positive integer. For example, in one embodiment, a supercycle is eight clock cycles long, while in other embodiments, the supercycle is a different number of clock cycles. In one embodiment, clock 145 provides the clock signal for clocking counter 125.

Receiver 110 includes buffer 120 for connecting to channel 155. In one embodiment, buffer 120 is a tri-state buffer for driving a feedback result on channel 155 or creating a high impedance state when receiver 110 is receiving data from transmitter 105. Receiver 110 also includes control logic 140 for detecting training sequence indications on channel 155, comparing received test patterns to expected values, and/or performing other functions. Receiver 110 also includes counter 130 for counting supercycles. In one embodiment, clock 150 provides the clock signal for clocking counter 130. In another embodiment, receiver 110 uses a clock signal received on channel 155 as the clock signal for clocking counter 130.

In the embodiment shown, transmitter 105 is configured to initiate an asynchronous feedback training sequence over one or more data lanes of channel 155. To initiate an asynchronous feedback training sequence, transmitter 105 transmits a training sequence indication on each lane being tested. The training sequence indication includes a first multi-bit sequence followed by a second multi-bit sequence, with the first multi-bit sequence being of opposite polarity from the second multi-bit sequence. For example, in one embodiment, the first multi-bit sequence is a sequence of zeroes and the second multi-bit sequence is a sequence of ones. The transition from the first multi-bit sequence to the second multi-bit sequence occurs at the midpoint of a supercycle.

Receiver 110 is configured to test the state of each data lane on supercycle boundaries. Receiver 110 detects the training sequence indication by detecting a voltage transition on successive tests and by detecting that the second multi-bit sequence lasts for the prescribed number of bits. After the training sequence indication, transmitter 105 transmits a test pattern, with the test pattern starting on a supercycle boundary. After detecting the training sequence indication, receiver 110 captures the test pattern sent by transmitter 105. Receiver 110 then checks the captured test pattern for errors.

After sending the test pattern, transmitter 105 disables buffer 115 and waits for receiver 110 to send feedback regarding the captured test pattern. Receiver 110 enables buffer 120 and sends the feedback, which may be referred to as an "error indication", to transmitter 105 after determining if any errors were detected in the captured test pattern.

In one embodiment, the feedback is a single bit that indicates whether any errors were detected. Receiver 110 drives the feedback on the given data lane of channel 155 to transmitter 105. Transmitter 105 captures the feedback and then uses the feedback (along with the feedback from other tests with other delay settings) to determine the data eye of the given data lane. After capturing the feedback, transmitter 105 determines whether to perform another test or to return to normal data operation. In various embodiments and scenarios, multiple asynchronous feedback training sequences are performed on multiple data lanes of channel 155 simultaneously.

System 100 is representative of any type of computing system or computing device which includes a transmitter 105 and a receiver 110. For example, in various embodiments, system 100 is a computer, a server, a compute node, a processor, a processing device, a programmable logic device, a memory device, a processing in memory (PIM) node, a mobile device, a television, an entertainment system or device, and/or other types of systems or devices. System 100 also includes any number of other transmitters and receivers in addition to transmitter 105 and receiver 110.

Figure 2:
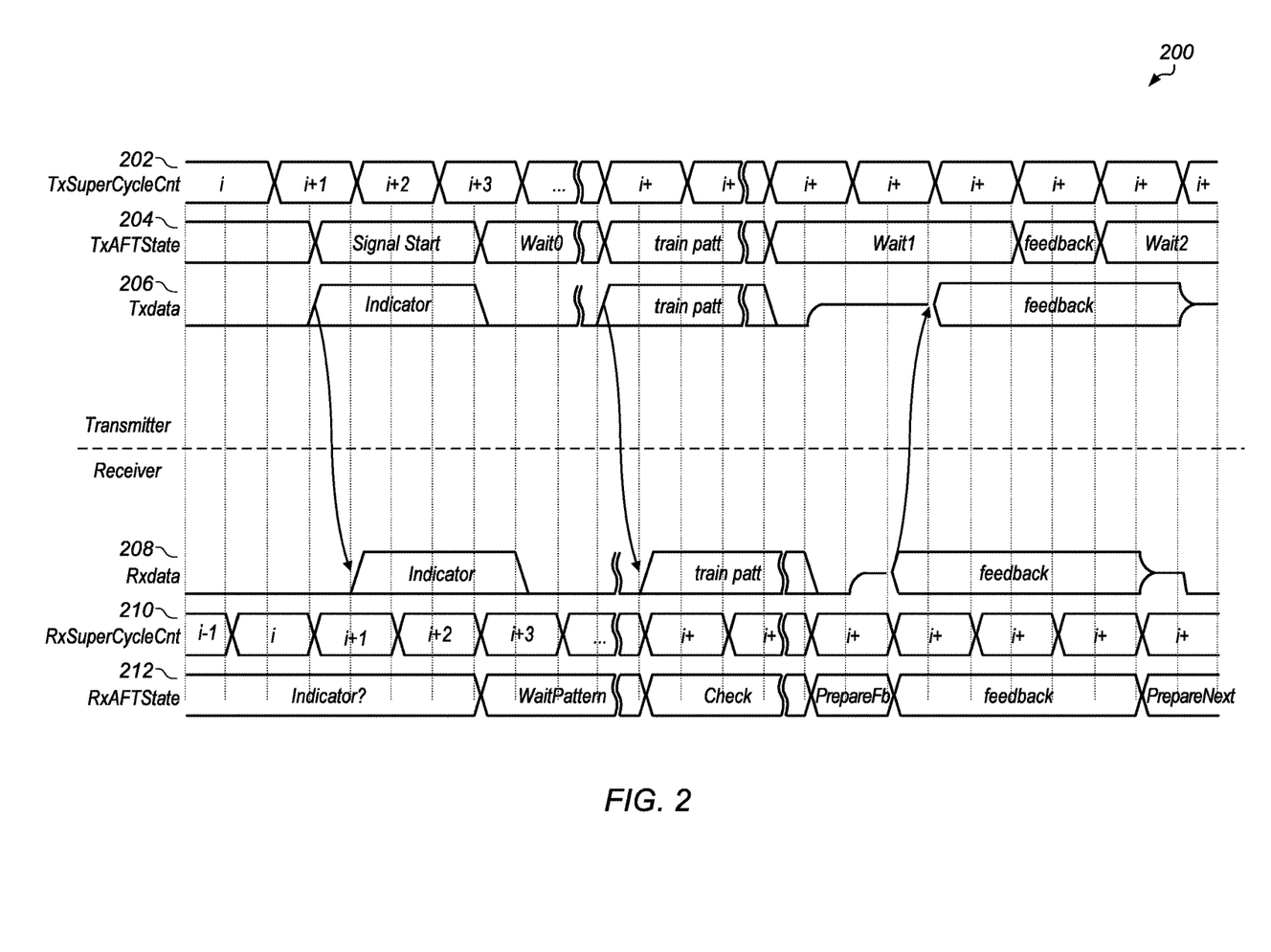
FIG. 2 is a timing diagram of one embodiment of an asynchronous feedback training sequence.

Turning now to FIG. 2, a timing diagram 200 of one embodiment of an asynchronous feedback training sequence is shown. In the illustrated embodiment, the asynchronous feedback training sequence is implemented between a transmitter (e.g., transmitter 105 of FIG. 1) and a receiver (e.g., receiver 110 of FIG. 1). The transmitter includes a counter 202 (TxSuperCycleCnt) to count supercycles and the receiver also includes a counter 210 (RxSuperCycleCnt) to count supercycles. In one embodiment, a supercycle is eight clock cycles in length, and the counters are modulo-8 counters. In other embodiments, the supercycle is a number of clock cycles other than eight. In the example shown, a transmitter state 204 (TxAFTState) transitions to a signal start state (Signal Start) at the midpoint of a supercycle. The transmitter sends a training sequence indication (Indicator) on the transmit data lane 206 (Txdata) starting at the midpoint of a supercycle when the transmitter enters the signal start state. In one embodiment, the training sequence indication is a transition from a binary zero to a binary one followed by a predetermined number of ones.

In the example shown, the receiver begins in a receiver state 212 (RxAFTState) in which it is waiting to detect the indicator (illustrated as "Indicator?"). The receiver transitions to the wait pattern state (WaitPattern) when it detects the indicator. In various embodiments, the receiver detects the indicator by detecting a transition from a zero to a one on the data lane 208 (Rxdata), followed by a predetermined number of ones. For example, in one embodiment the receiver checks the status of the receive data lane 208 at the end of each supercycle. If the receiver detects a change in the data lane 208 from '0' to '1' in two consecutive supercycles, then the receiver transitions to the waiting for pattern state during which it continues to monitor the received data each supercycle to determine if the predetermined number of ones is received. As shown in diagram 200, the receiver transitions to the waiting for pattern state at the start of super cycle count "i+3".

The training sequence indication is of any length depending on the embodiment, with the length known by the receiver. After the training sequence indication is sent from the transmitter to the receiver, the transmitter sends the test pattern to the receiver. In one embodiment, the test pattern is a pseudo-random binary sequence (PRBS). Generally speaking, a PRBS is a deterministic binary sequence that exhibits behavior similar to that of a random binary sequence. The receiver receives the test pattern and check whether there are any errors in the received test pattern by comparing the received data to expected values.

After transmitting the test pattern, the transmitter disables its output buffer. In one embodiment the output buffer is a tri-state buffer that is switched to a high impedance state by the transmitter after the transmitter has sent the test pattern to the receiver. After a period of time of preparing the feedback, the receiver activates its output buffer and send feedback to the transmitter. In one embodiment, the feedback indicates if there were any errors in the received test pattern. In one embodiment, the feedback is a single bit. In other embodiments, the feedback utilizes multiple bits to indicate the number of errors. The transmitter then receives the feedback and utilizes the feedback to determine if the current delay settings were inside or outside of the data eye. After the transmitter receives the feedback, the transmitter alters one or more delay settings and another test is performed if the training is deemed incomplete (e.g., there are errors indicated). Alternatively, the training is deemed complete (e.g., if there are no errors indicated) and the transmitter enters a normal data operation mode.

Figure 3:
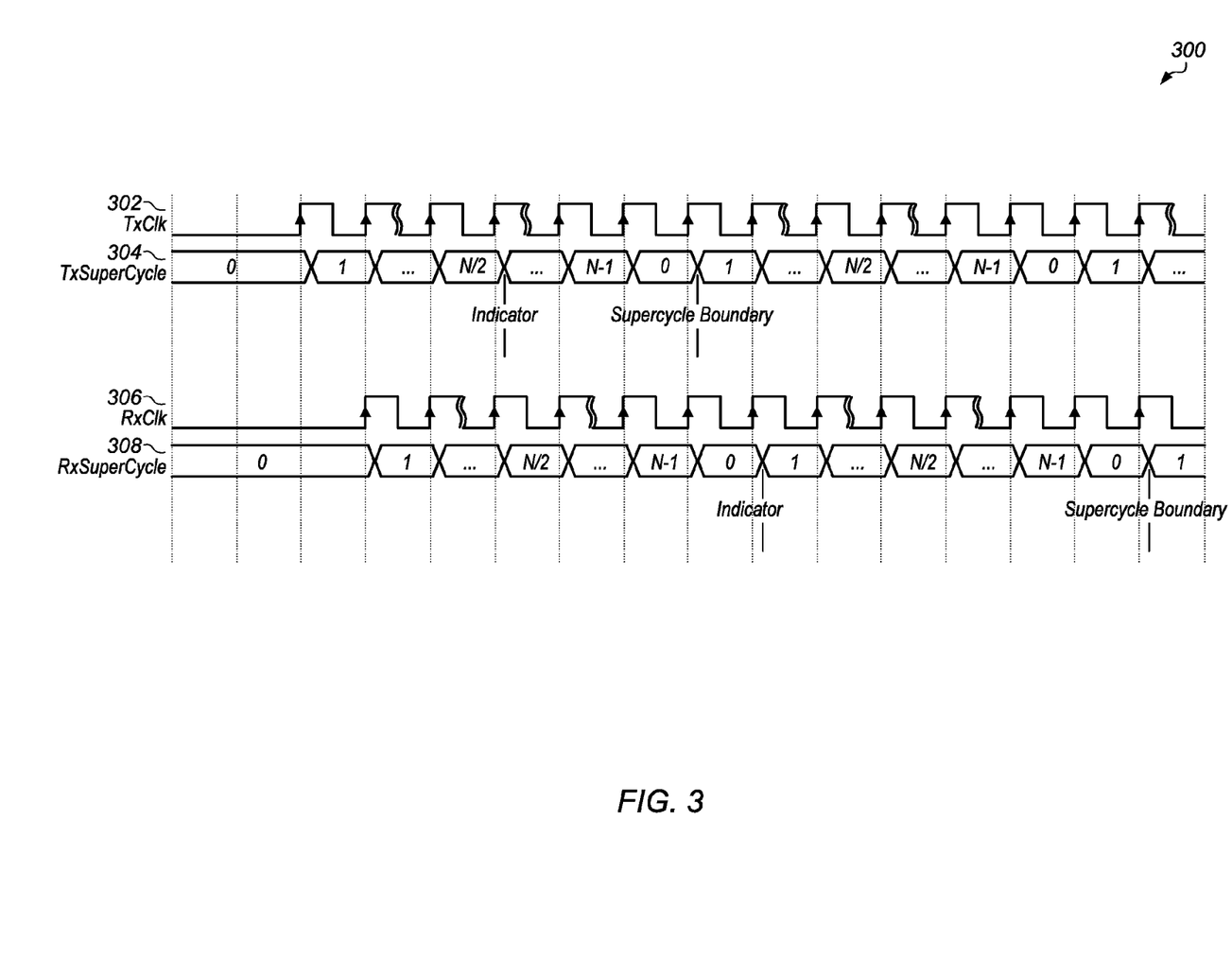
FIG. 3 is a timing diagram of one embodiment of asynchronous feedback training supercycle counters.

Referring now to FIG. 3, one embodiment of a timing diagram 300 corresponding to asynchronous feedback training is shown. As noted, asynchronous feedback training may use a training sequence indicator to facilitate communication between the transmitter and the receiver. In one embodiment, the receiver is configured to determine when to start checking for test patterns. When the transmitter clock 302 starts, both the transmitter and the receiver keep track of integer multiple 'N' clock boundaries where 'N' is stored in a programmable register and where 'N' represents the number of clock cycles in a supercycle. The transmitter counts supercycle boundaries and the transmitter also keeps track of N/2 supercycle boundaries as well. In various embodiments, the receiver only tracks supercycle boundaries. In one embodiment, when sending the training sequence indication, the transmitter transmits a string of 1's beginning on a half (N/2) super cycle boundary (i.e., the midpoint of a supercycle). Transmitting the indication in the middle of the supercycle helps ensure that the training sequence indication transition lies completely within the supercycle boundary at the receiver and not at the boundary itself. With this assumption, the receiver can count a programmable (M) number of supercycles from when it receives the training sequence indication in order to determine when to start checking for a test pattern(s). For example, the transmitter is programmed to begin sending a test pattern on a boundary of the $M^{th}$ supercycle, where M is an integer that is also programmable in some embodiments. In other embodiments, M is not programmable (e.g., M is fixed in hardware). The receiver is similarly configured to know the test pattern will begin M supercycles after detection of the training sequence indication.

Timing diagram 300 illustrates one embodiment of how supercycle counters are initialized after a state change on the communication channel. As noted, the transmitter has a supercycle counter 304 to count supercycles. The cycles of the transmit clock 302 are shown in the row above the transmit supercycle counter 304. In one embodiment, one supercycle corresponds to eight clock cycles of the transmit clock 302. In such an embodiment, the counter is a modulo-eight counter. In other embodiments, a supercycle corresponds to a different number of transmit clock cycles. The receiver also includes a supercycle counter 308 that counts supercycles, with supercycle counter 308 shown below the cycles of receiver clock 306.

In order to initiate an asynchronous feedback training test, the transmitter transmits a training sequence indicator (Indicator) to the receiver. In one embodiment, the training sequence indicator is a transition from a zero to a one, followed by a predetermined number of ones. The length of the sequence of ones may vary according to the embodiment, with the receiver having knowledge of the length of the sequence in order to detect the training sequence indicator. In one embodiment, the transition from the sequence of zeroes to the sequence of ones occurs at the midpoint of a supercycle as determined by the transmitter's supercycle counter 304. The receiver detects this transition after checking the state of the channel on each supercycle boundary. For example, the receiver detects a low voltage on the channel at a given supercycle boundary and then the receiver detects a high voltage on the channel at the subsequent supercycle boundary. In response to detecting the change in the channel on successive supercycle boundaries, the receiver then counts a number of subsequent high voltage states on the channel to determine if a training pattern sequence is received. Then, after the prescribed number of supercycles and ones are received, the test pattern begins (assuming the training sequence indication was detected). As shown, the test pattern begins at a supercycle boundary in timing diagram 300. The receiver receives the test pattern and check the test pattern for errors. After checking the accuracy of the test pattern, the receiver returns feedback to the transmitter regarding the presence or absence of errors.

Figure 4:
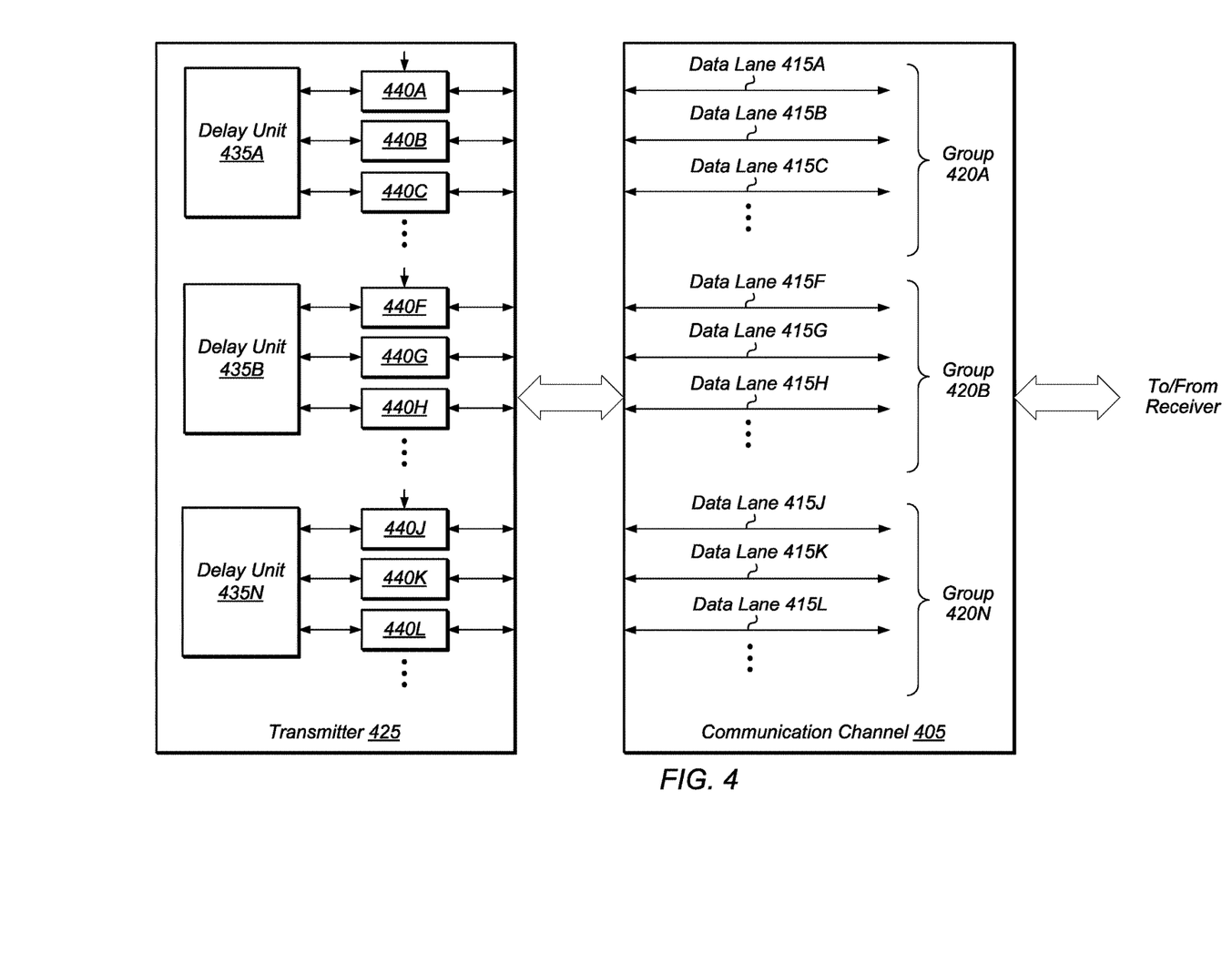
FIG. 4 is a block diagram of one embodiment of a communication channel and a transmitter.

Turning now to FIG. 4, a block diagram of one embodiment of a communication channel 405 and a transmitter 425 is shown. Communication channel 405 is representative of any type of communication channel connecting a transmitter 425 and a receiver (not shown). Communication channel 405 may have any number of data lanes 415A-415L depending on the embodiment. Each data lane 415A-415L is configured to carry a serial bitstream. Communication channel 405 also includes a clock lane (not shown) and/or one or more other lanes.

In one embodiment, the data lanes 415A-415L of communication channel 405 are organized into groups 420A-

420N of data lanes. The layout of each group 420A-420N of data lanes is optimized so as to match the length of each data lane of a given group to minimize signal skew for the group. Then, each group of data lanes is coupled to a corresponding delay unit 435A-435N that is configured to choose a single delay setting for all data lanes of the corresponding group. Each of the delay units 435A-435N is configured to set a delay setting for its group of data lanes independently of the delay settings selected by other delay units 435A-435N. For example, in one scenario delay unit 435A selects a single delay setting for each of lanes 440A-440C, while delay unit 435B selects a different single delay setting for lanes 440F-440H. In various embodiments, delay units 435A-435N comprise phase interpolation and/or other circuitry and are configured to set delays for their respective groups that may differ from delays set for other groups. Accordingly, delay unit 435A applies a single delay (i.e., the same delay) to all data lines 415A-415C of data group 420A, delay unit 435B applies a single delay to all data lines 415F-415H of data group 420B, and delay unit 435N applies a single delay to all data lines 415J-415L of data group 420N. In addition, each data lane 415A-415L is optimized with a further delay using individually controlled delay elements 440A-440L. In one embodiment, the further level of delay applied by delay elements 440A-440L is individually programmed after performing an asynchronous feedback training sequence as described herein.

It is noted that groups 420A-420N and delay units 435A-435N are representative of any number of groups and delay unit circuitry, respectively, that are implemented for a given communication channel 405. In one embodiment, each group 420A-420N has the same number of data lanes. In other embodiments, some of the groups 420A-420N have different numbers of data lanes from other groups of groups 420A-420N.

Figure 5:
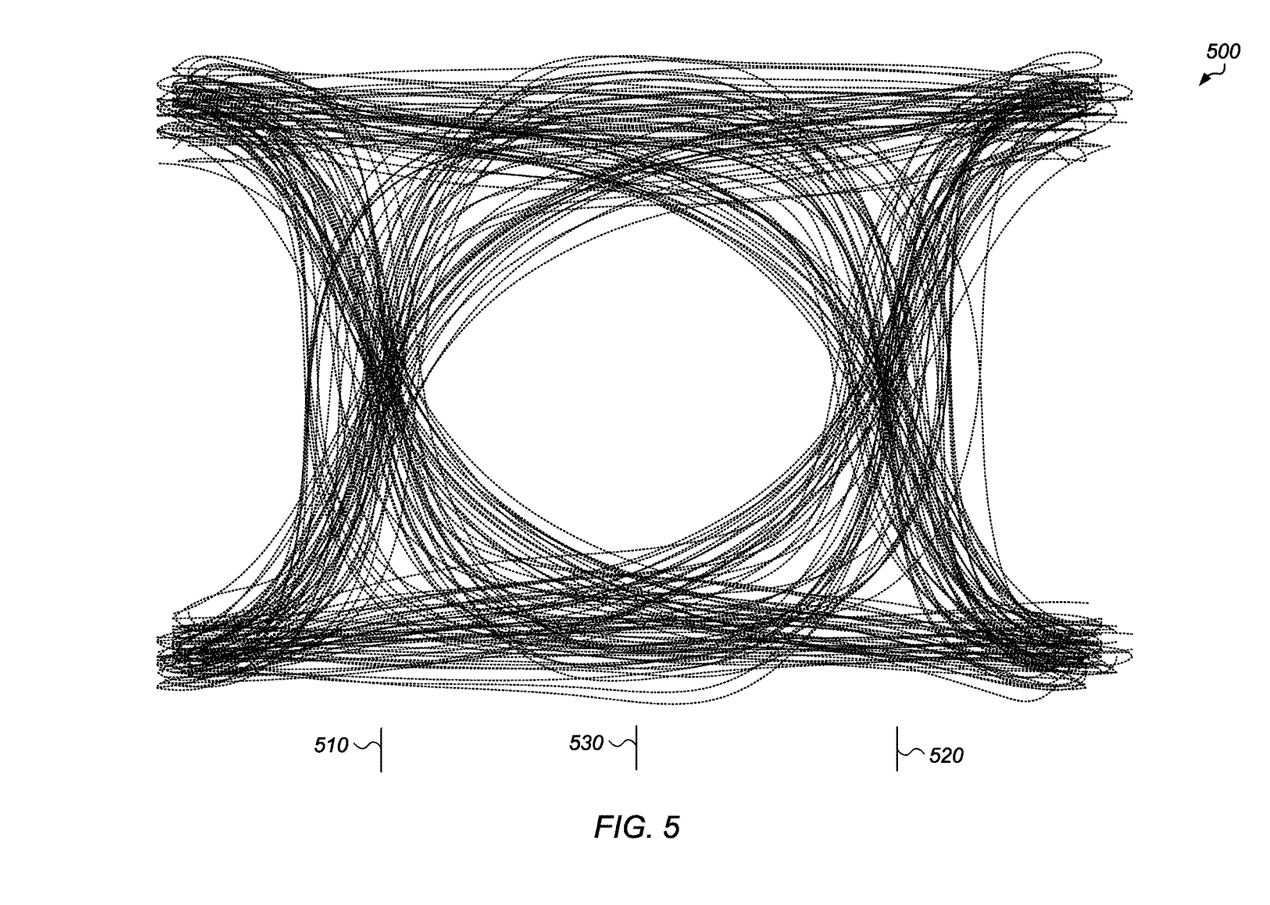
FIG. 5 is a diagram of one embodiment of a data eye.

Referring now to FIG. 5, a diagram of one embodiment of a data eye 500 is shown. Data eye 500 is one example of a data valid period which is monitored by capturing the bit transitions on a data lane of a channel (e.g., communication channel 405 of FIG. 4). In one embodiment, a transmitter (e.g., transmitter 425 of FIG. 4) is configured to perform multiple asynchronous feedback training sequences at different delay settings to detect the boundaries of the data eye 500. The transmitter is configured to receive feedback from the receiver (e.g., receiver 110 of FIG. 1) regarding the results of each test. The receiver drives feedback on a given data lane to indicate if no errors were detected for a given test or if one or more errors were detected for the given test.

In various embodiments, the transmitter runs multiple tests at multiple delay settings, and when the feedback goes from bad (i.e., one or more errors) to good (i.e., no errors), the transmitter recognizes that particular delay setting as coinciding with the opening 510 of data eye 500. The transmitter adds delays in small increments and performs additional tests, and when the feedback goes from good to bad, the transmitter identifies this as the closing 520 of data eye 500. The transmitter takes the average of the opening 510 and the closing 520 to calculate the center 530 of data eye 500. The delay settings corresponding to the center 530 of data eye 500 are considered the delay settings for the given data lane of the channel. The transmitter performs these tests for each data lane of the channel.

Figure 6:
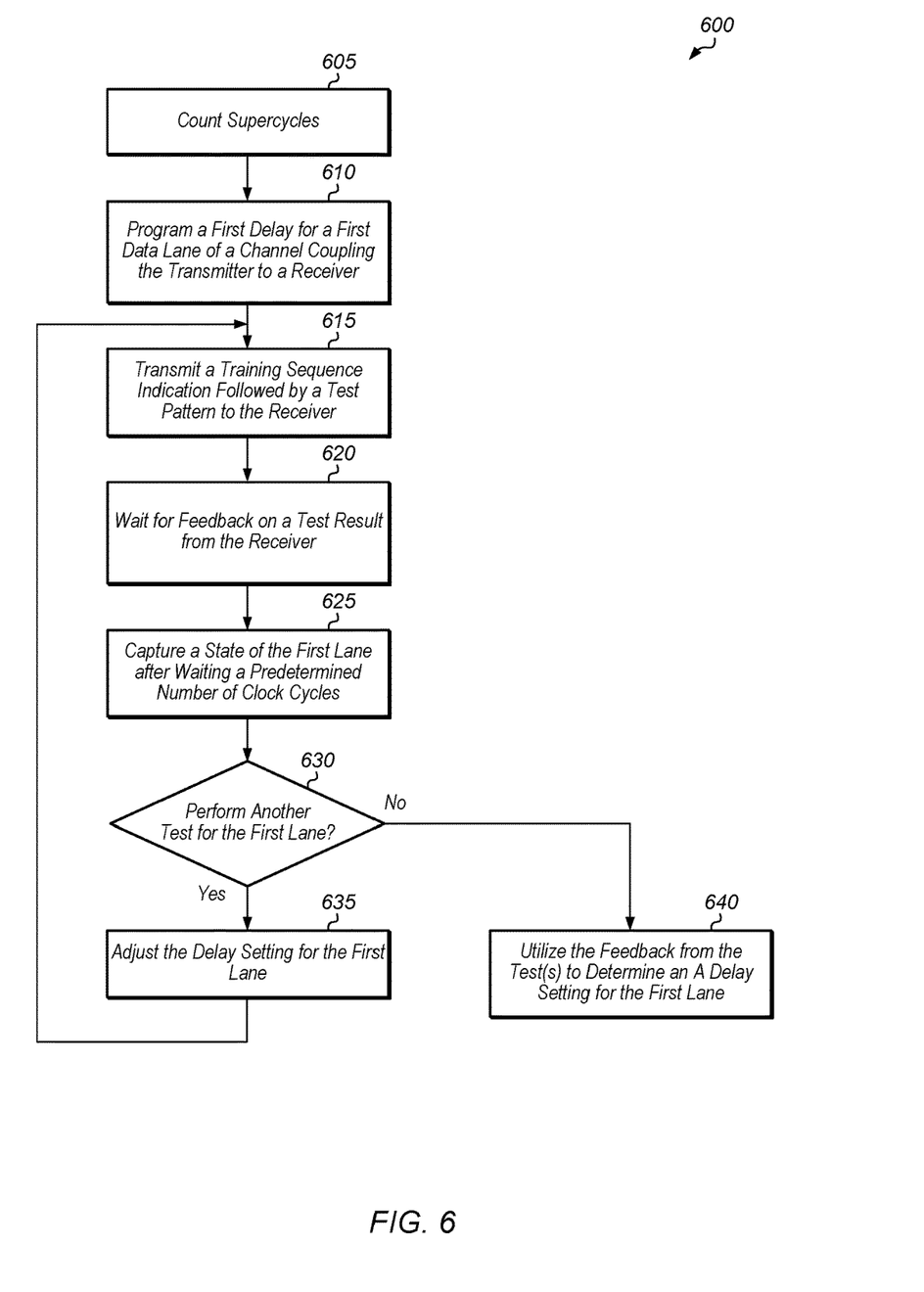
FIG. 6 is a generalized flow diagram illustrating one embodiment of a method for implementing an asynchronous test sequence for a first data lane of a channel.

Turning now to FIG. 6, one embodiment of a method 600 for performing an asynchronous training sequence for a first data lane of a channel is shown. For purposes of discussion, the steps in this embodiment are shown in sequential order. It should be noted that in various embodiments of the method described below, one or more of the elements described are performed concurrently, in a different order than shown, or are omitted entirely. Other additional elements may also be performed as desired. Similar alternative embodiments apply to the method steps illustrated in FIG. 7. Any of the various systems or apparatuses described herein are configured to implement method 600.

A transmitter utilizes a counter to count supercycles (block 605). In various embodiments, a supercycle is 'N' clock cycles, with 'N' being a positive integer. For example, in one embodiment, a supercycle corresponds to eight cycles of another higher frequency system clock, while in other embodiments the supercycle corresponds to a different number of clock cycles. The transmitter programs a first delay setting (or otherwise already has an initial delay setting) for a first data lane of a channel coupling the transmitter to a receiver (block 610).

Next, the transmitter transmits a training sequence indication followed by a test pattern to the receiver (block 615). In one embodiment, the training sequence indication includes a bit transition from a first binary value to a second different binary value (e.g., zero to one, or vice-versa) followed by a sequence of bits of the second binary value. For example, in one embodiment, the training sequence indication begins with a transition from a zero to one followed by a series of ones. The series of ones include a predetermined number of bits. In one embodiment, the transition from the zero to one occurs at a midpoint of a supercycle, and the transition from the training sequence indication to the test pattern occurs at an end of a supercycle.

After transmitting the test pattern to the receiver, the transmitter disables the output buffer coupled to the first lane of the channel and waits for feedback from the receiver (block 620) on the same first lane of the channel. In various embodiments, the feedback includes an indication as to whether the receiver detected an error in the transmitted test pattern. In one embodiment, the transmitter waits a predetermined number of clock cycles after finishing sending the test pattern. Next, the transmitter captures a state of the first lane after waiting the predetermined number of clock cycles (block 625). In some cases, the predetermined number of cycles is specified in supercycles.

Next, the transmitter determines whether to perform another test for the first lane (conditional block 630). In one embodiment, the transmitter performs a number of tests with different delay settings in an effort to identify the data eye of the first lane. If the transmitter determines to perform another test for the first lane (conditional block 630, "yes" leg), then the transmitter adjusts the delay setting for the first lane (block 635) and the method 600 then returns to block 615. If the transmitter determines not to perform another test for the first lane (conditional block 630, "no" leg), then the transmitter utilizes the feedback from the test(s) to determine a delay setting for the first lane (block 640). After block 640, method 600 ends. It is noted that the transmitter may perform multiple instances of method 600 in parallel for a plurality of data lanes of a communication channel.

Figure 7:
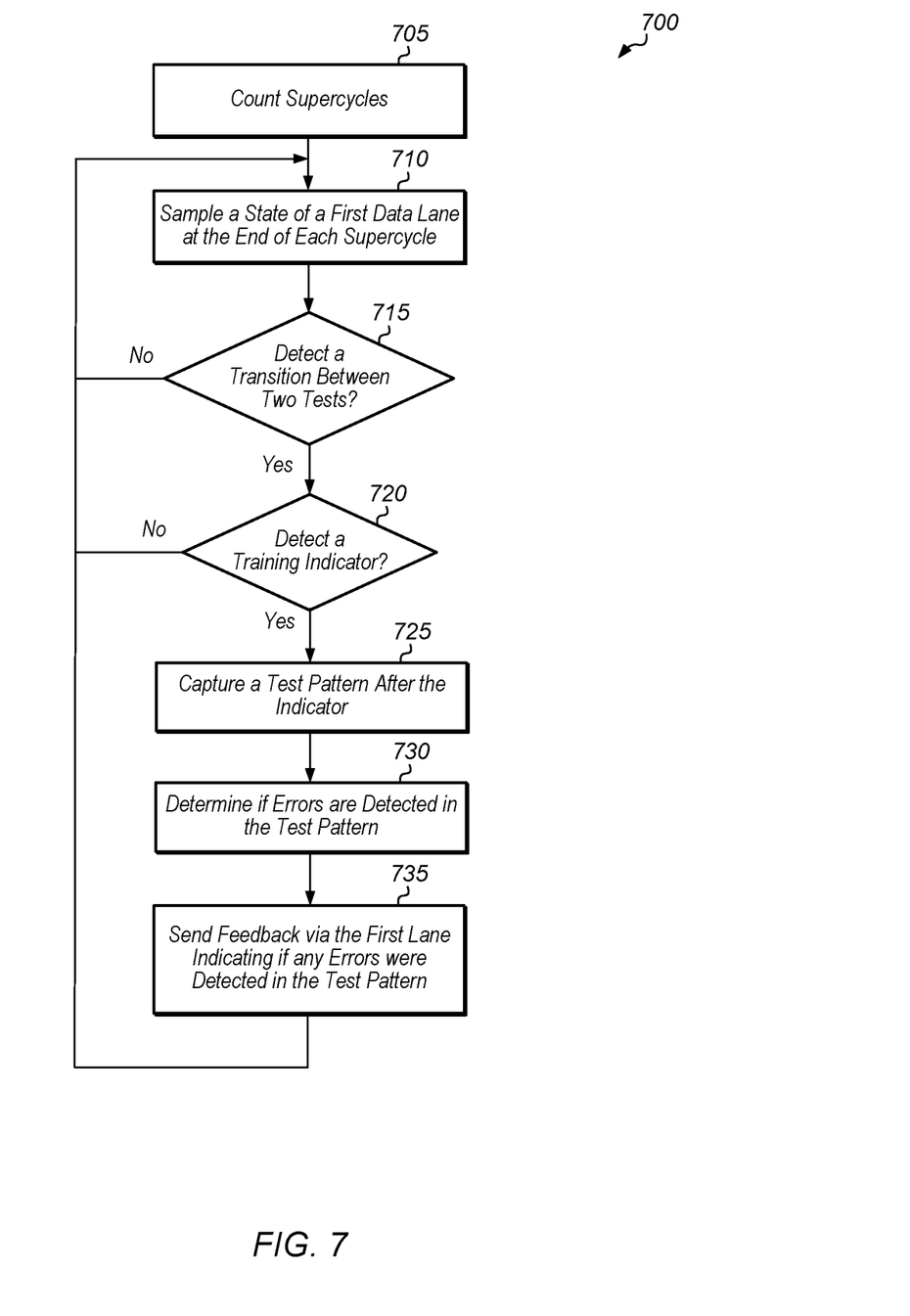
FIG. 7 is a generalized flow diagram illustrating another embodiment of a method for implementing an asynchronous test sequence for a first data lane of a channel.

Referring now to FIG. 7, one embodiment of a method 700 for implementing an asynchronous test sequence for a first data lane of a channel is shown. In various embodiments, a receiver is configured to count supercycles (block 705). In one embodiment, a single supercycle corresponds to 'N' clock cycles of a system clock with a higher clock frequency, with 'N' being a positive integer. For example, in one embodiment, a supercycle is eight (system) clock cycles long, while in other embodiments, the supercycle corresponds to a different number of clock cycles.

In block 710, the receiver samples a state of a first data lane at the end (or boundary) of each supercycle. The first data lane is one lane of a channel coupling the receiver to a transmitter. The receiver determines if a voltage transition (e.g., representing a bit transition) is detected on the first lane between two successive tests (conditional block 715). If a transition is detected on the first lane on two successive samples (conditional block 715, "yes" leg), then the receiver continues sampling the first data lane to determine if a training sequence indication is received on the first lane (conditional block 720). In one embodiment, the receiver determines the training sequence indication is being received on the first lane if the values detected on the first lane match an expected training sequence indication for the predetermined number of clock cycles. For example, for embodiments where the training sequence indication is a transition followed by a sequence of ones of a predetermined length, the receiver monitors the first lane to determine if the sequence of ones continues for the predetermined length after the receiver has detected the transition in conditional block 715.

If the receiver detects the training sequence indication on the first lane (conditional block 720, "yes" leg), then the receiver begins capturing the data on the first data lane after the training sequence indication ends (block 725). In various embodiments, the test pattern has a predetermined length and data of the predetermined length will be captured by the receiver. In one embodiment, the training sequence indication ends at a supercycle boundary, and the test pattern starts at the supercycle boundary. The exact lengths of the training sequence indication and the test pattern are known by the receiver. If the receiver does not detect the training sequence indication on the first lane (conditional block 720, "no" leg), then method 700 returns to block 710 with the receiver continuing to monitor the first lane.

After block 725, the receiver tests the captured test pattern for errors (block 730). In one embodiment, the test pattern is a pseudorandom binary sequence of predetermined length with a known bit pattern. Then, the receiver sends, to the transmitter on the first lane, feedback indicating if any errors were detected in the captured test pattern (block 735). After block 735, method 700 returns to block 710 with the receiver continuing to monitor the first lane. It is noted that the receiver may perform multiple instances of method 700 simultaneously for a plurality of data lanes coupled between the receiver and the transmitter.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a transmitter; and
a receiver coupled to the transmitter via a communication channel including one or more data lanes;
wherein the transmitter is configured to:
initiate an asynchronous feedback training sequence by transmitting a training sequence indication as a plurality of bits during a supercycle comprising a first multi-bit sequence followed by a second multi-bit sequence, where the first multi-bit sequence and the second multi-bit sequence are of opposite polarity and a transition from the first multi-bit sequence to the second multi-bit sequence occurs at a midpoint of the supercycle; and
transmit a test pattern on a first lane of the channel at the end of the supercycle; and
wherein the receiver is configured to:
receive the training sequence indication;
sample a state of the first lane at an end of each supercycle;
responsive to determining that a transition occurs on the first lane between two successive tests:
sample the state of the first lane at an end of each supercycle;
if the state of the first lane does not change for a predetermined number of samples, determine the training sequence indication has been detected; and
if the state of the first lane does change during the predetermined number of samples, determine the training sequence indication has not been detected;
capture the test pattern responsive to detecting the training sequence indication; and
convey an error indication to the transmitter via the first lane that indicates whether any errors were detected in the test pattern;
wherein each of the transmitter and the receiver includes a supercycle counter for counting supercycles, with a single supercycle corresponding to N clock cycles of a system clock, where N is an integer greater than 1.

2. The system as recited in claim 1, wherein responsive to receiving the error indication, the transmitter is configured to change a delay setting for the first lane if the error indication indicates an error was detected.

3. The system as recited in claim 1, wherein the transmitter uses a first system clock for counting supercycles and the receiver uses a second system clock different from the first system clock for counting supercycles.

4. The system as recited in claim 1, wherein the receiver is configured to determine when to capture the test pattern sequence by using the training sequence indication to identify the supercycle.

5. The system as recited in claim 1, wherein the error indication is a single bit.

6. An apparatus comprising:
a transmitter;
a receiver; and
a communication channel comprising a plurality of data lanes;
wherein the transmitter is configured to:
initiate an asynchronous feedback training sequence by transmitting a training sequence indication as a plurality of bits during a supercycle comprising a first multi-bit sequence followed by a second multi-bit sequence, where the first multi-bit sequence and the second multi-bit sequence are of opposite polarity and a transition from the first multi-bit sequence to the second multi-bit sequence occurs at a midpoint of the supercycle; and transmit a test pattern on each lane of the plurality of lanes; and wherein the receiver is configured to:
receive the training sequence indication;
sample a state of the first lane at an end of each supercycle;
responsive to determining that a transition occurs on the first lane between two successive tests:
sample the state of the first lane at an end of each supercycle;
if the state of the first lane does not change for a predetermined number of samples, determine the training sequence indication has been detected; and
if the state of the first lane does change during the predetermined number of samples, determine the training sequence indication has not been detected;
capture the test pattern responsive to detecting the training sequence indication; and
convey an error indication to the transmitter via the first lane that indicates whether any errors were detected in the test pattern;
wherein each of the transmitter and the receiver includes a supercycle counter for counting supercycles, with a single supercycle corresponding to N clock cycles of a system clock, where N is an integer greater than 1.

7. The apparatus as recited in claim 6, wherein the transmitter comprises:
a separate delay unit comprising circuitry for each of the plurality of lanes; and
a single delay unit configured to apply a single delay setting to a group of lanes of the plurality of lanes.

8. The apparatus as recited in claim 6, wherein the transmitter uses a first system clock for counting supercycles and the receiver uses a second system clock different from the first system clock for counting supercycles.

9. The apparatus as recited in claim 6, wherein the receiver is configured to determine when to capture the test pattern sequence by using the training sequence indication to identify the supercycle.

10. The apparatus as recited in claim 6, wherein the error indication is a single bit.

11. A method comprising:
initiating, by a transmitter, an asynchronous feedback training sequence indication as a plurality of bits during a supercycle comprising a first multi-bit sequence followed by a second multi-bit sequence, where the first multi-bit sequence and the second multi-bit sequence are of opposite polarity and a transition from the first multi-bit sequence to the second multi-bit sequence occurs at a midpoint of the supercycle;

transmitting a test pattern to a receiver on a first lane of a channel;

receiving, by the receiver, the training sequence indication; and sampling a state of the first lane at an end of each supercycle;

responsive to determining that a transition occurs on the first lane between two successive tests:
sampling the state of the first lane at an end of each supercycle;
if the state of the first lane does not change for a predetermined number of samples, determining the training sequence indication has been detected; and
if the state of the first lane does change during the predetermined number of samples, determining the training sequence indication has not been detected;
capturing the test pattern responsive to detecting the training sequence indication;
conveying an error indication to the transmitter via the first lane that indicates whether any errors were detected in the test pattern;
wherein each of the transmitter and the receiver includes a supercycle counter for counting supercycles, with a single supercycle corresponding to N clock cycles of a system clock, where N is an integer greater than 1.

12. The method as recited in claim 11, further comprising changing a delay setting for the first lane if the error indication indicates an error was detected responsive to receiving the error indication.

13. The method as recited in claim 11, further comprising the transmitter using a first system clock for counting supercycles and the receiver using a second system clock different from the first system clock for counting supercycles.

14. The method as recited in claim 11, wherein the method further comprising determining when to capture the test pattern sequence by using the training sequence indication to identify the supercycle.

* * * * *